United States Patent
Lin et al.

(10) Patent No.: US 11,147,009 B2
(45) Date of Patent: Oct. 12, 2021

(54) APPARATUSES AND METHODS FOR CONFIGURATION OF INITIAL DOWNLINK (DL) BANDWIDTH PART (BWP)

(71) Applicant: MEDIATEK INC., Hsinchu (TW)

(72) Inventors: Guan-Yu Lin, Hsinchu (TW); Yuanyuan Zhang, Beijing (CN); Chia-Chun Hsu, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 17/262,977

(22) PCT Filed: Jul. 12, 2019

(86) PCT No.: PCT/CN2019/095788
§ 371 (c)(1),
(2) Date: Jan. 25, 2021

(87) PCT Pub. No.: WO2020/029746
PCT Pub. Date: Feb. 13, 2020

(65) Prior Publication Data
US 2021/0144627 A1  May 13, 2021

Related U.S. Application Data

(60) Provisional application No. 62/715,303, filed on Aug. 7, 2018.

(51) Int. Cl.
*H04W 48/12* (2009.01)
*H04W 76/27* (2018.01)
(Continued)

(52) U.S. Cl.
CPC ....... *H04W 48/12* (2013.01); *H04W 74/0833* (2013.01); *H04W 76/27* (2018.02); *H04W 84/042* (2013.01)

(58) Field of Classification Search
CPC . H04W 48/12; H04W 76/27; H04W 74/0833; H04W 84/042
See application file for complete search history.

(56) References Cited

U.S. PATENT DOCUMENTS

2018/0192383 A1* 7/2018 Nam .................. H04J 11/00
2019/0044689 A1* 2/2019 Yiu .................. H04W 72/042
(Continued)

FOREIGN PATENT DOCUMENTS

| CN | 108012329 A | 5/2018 |
| WO | 2018/128427 A1 | 7/2018 |
| WO | 2018/128440 A1 | 7/2018 |

OTHER PUBLICATIONS

International Search Report and Written Opinion dated Aug. 28, 2019, issued in application No. PCT/CN2019/095788.
(Continued)

*Primary Examiner* — Kyaw Z Soe
(74) *Attorney, Agent, or Firm* — McClure, Qualey & Rodack, LLP (57) ABSTRACT

A User Equipment (UE) including a wireless transceiver and a controller is provided. The wireless transceiver performs wireless transmission and reception to and from a cell. The controller receives a System Information Block type1 (SIB1) comprising first configuration of a bandwidth size of an initial Downlink (DL) Bandwidth Part (BWP) from the cell via the wireless transceiver, and applies the first configuration for communication with the cell via the wireless transceiver in response to the UE in a Radio Resource Control (RRC) idle or inactive state successfully completing a random access procedure.

12 Claims, 6 Drawing Sheets

(51) Int. Cl.
*H04W 74/08* (2009.01)
*H04W 84/04* (2009.01)

(56) References Cited

U.S. PATENT DOCUMENTS

2019/0082480 A1* 3/2019 Wu ................... H04W 48/20
2019/0223086 A1* 7/2019 Jung .................. H04W 76/10
2019/0394776 A1* 12/2019 Lee .................. H04W 72/0453
2020/0137718 A1* 4/2020 Agiwal .............. H04W 72/042
2020/0221508 A1* 7/2020 Huang .............. H04W 74/0833
2020/0314893 A1* 10/2020 Chou ................. H04W 74/006

OTHER PUBLICATIONS

"SI reception during handover ;" 3GPP TSG-RAN WG2 NR AdHoc #1807, R2-1809786; Jun. 2018; pp. 1-7.
Chinese language office action dated Aug. 6, 2020, issued in application No. TW 108127697.

* cited by examiner

APPARATUSES AND METHODS FOR CONFIGURATION OF INITIAL DOWNLINK (DL) BANDWIDTH PART (BWP)

CROSS REFERENCE TO RELATED APPLICATIONS

This Application claims priority of U.S. Provisional Application No. 62/715,303, filed on Aug. 7, 2018, the entirety of which is incorporated by reference herein.

FIELD OF THE APPLICATION

The application generally relates to mobile communications, and more particularly, to apparatuses and methods for configuration of an initial Downlink (DL) Bandwidth Part (BWP).

DESCRIPTION OF THE RELATED ART

In a typical mobile communication environment, a UE (which is also called a Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various cellular technologies, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, Time Division LTE (TD-LTE) technology, and others.

These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In 5G NR, the concept of Bandwidth Part (BWP) is introduced. A BWP is a bandwidth consisting of physical resource blocks continuous in frequency domain. A UE is configured and required to monitor only one Uplink/Downlink (UL/DL) BWP, i.e. active UL/DL BWP, and there is no need for a UE to monitor or to transmit/receive on the other BWP except for the active UL/DL BWP. Since a BWP may have a narrower bandwidth than the carrier bandwidth, introducing BWP in 5G NR is advantageous in UE power saving because a UE only needs to monitor its active UL/DL BWP, instead of the whole carrier bandwidth.

However, due to the specifications for 5G NR still being under discussion among 3GPP members, many details are not yet specified, including whether a UE should apply the bandwidth size derived from a Master Information Block (MIB) or System Information Block type1 (SIB1) for the initial DL BWP.

In 5G NR, a service network may configure the bandwidth size of the initial DL BWP through both a MIB and a SIB1 to a UE. However, it is indeterminate when should the UE apply the bandwidth size configuration in the SIB1 after the SIB1 is received. In fact, the bandwidth size derived from the SIB1 is generally larger than the bandwidth size derived from the MIB, and if the UE applies the bandwidth size derived from the SIB1 when there is no need to receive DL message/data with a wider bandwidth, unnecessary power consumption of the UE may be incurred.

BRIEF SUMMARY OF THE APPLICATION

In order to solve the aforementioned problem, the present application proposes that the UE postpones the timing of applying a wider bandwidth for the initial DL BWP as specified in the SIB1. To be specific, upon successful SIB1 acquisition, UE stores the bandwidth size of the initial DL BWP as specified in the SIB1, but does not apply the configuration immediately. The UE does not apply the bandwidth size configuration from the SIB1 until the UE enters a state (e.g., the RRC connected state) with a higher data rate requirement. Before entering the state with a higher data rate requirement, the UE continues to use the bandwidth size configuration as specified in the MIB.

In one aspect of the application, a User Equipment (UE) comprising a wireless transceiver and a controller is provided. The wireless transceiver is configured to perform wireless transmission and reception to and from a cell. The controller is configured to receive a System Information Block type1 (SIB1) comprising first configuration of a bandwidth size of an initial Downlink (DL) Bandwidth Part (BWP) from the cell via the wireless transceiver, and apply the first configuration for communication with the cell via the wireless transceiver in response to the UE in a Radio Resource Control (RRC) idle or inactive state successfully completing a random access procedure.

In another aspect of the application, a method for configuration of an initial DL BWP, executed by a UE communicatively connected to a cell, is provided. The method comprises the steps of: receiving a SIB1 comprising first configuration of a bandwidth size of the initial DL BWP from the cell; and applying the first configuration for communication with the cell in response to the UE in an RRC idle or inactive state successfully completing a random access procedure.

Other aspects and features of the present application will become apparent to those with ordinarily skill in the art upon review of the following descriptions of specific embodiments of the UEs and the methods for configuration of an initial DL BWP.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
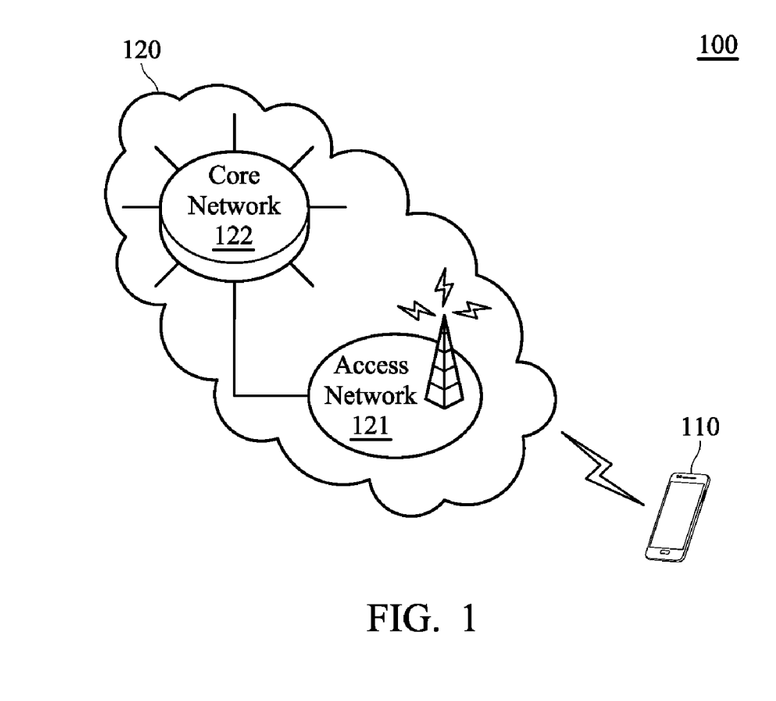
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 may include a User Equipment (UE) 110 and a service network 120, wherein the UE 110 may be wirelessly connected to the service network 120 for obtaining mobile services.

The UE 110 may be a feature phone, a smartphone, a panel Personal Computer (PC), a laptop computer, or any wireless communication device supporting the cellular technology (e.g., the 5G NR technology) utilized by the service network 120.

In another embodiment, the UE 110 may support more than one cellular technology. For example, the UE may support the 5G NR technology and a legacy cellular technology, such as the LTE/LTE-A/TD-LTE technology, or the WCDMA technology.

The service network 120 may include an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). The access network 121 and the core network 122 may each include one or more network nodes for carrying out said functions.

In one embodiment, the service network 120 may be a 5G NR network, and the access network 121 and the core network 122 may be a Next Generation-Radio Access Network (NG-RAN) and a Next Generation-Core Network (NG-CN), respectively.

A NG-RAN may include one or more cellular stations, such as next generation NodeBs (gNBs), which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs and receive system information broadcasts (e.g., a Master Information Block (MIB), and a System Information Block type1 (SIB1), etc.) from the cell(s), wherein the camped cell(s) may be referred to as serving cells, including a Primary cell (PCell) and one or more Secondary cells (SCells).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the wireless communication environment 100 described in the embodiment of FIG. 1 are for illustrative purposes only and are not intended to limit the scope of the application.

For example, the wireless communication environment 100 may include both a 5G NR network and a legacy network (e.g., an LTE/LTE-A/TD-LTE network, or a WCDMA network), and the UE 110 may be wirelessly connected to both the 5G NR network and the legacy network.

Figure 2:
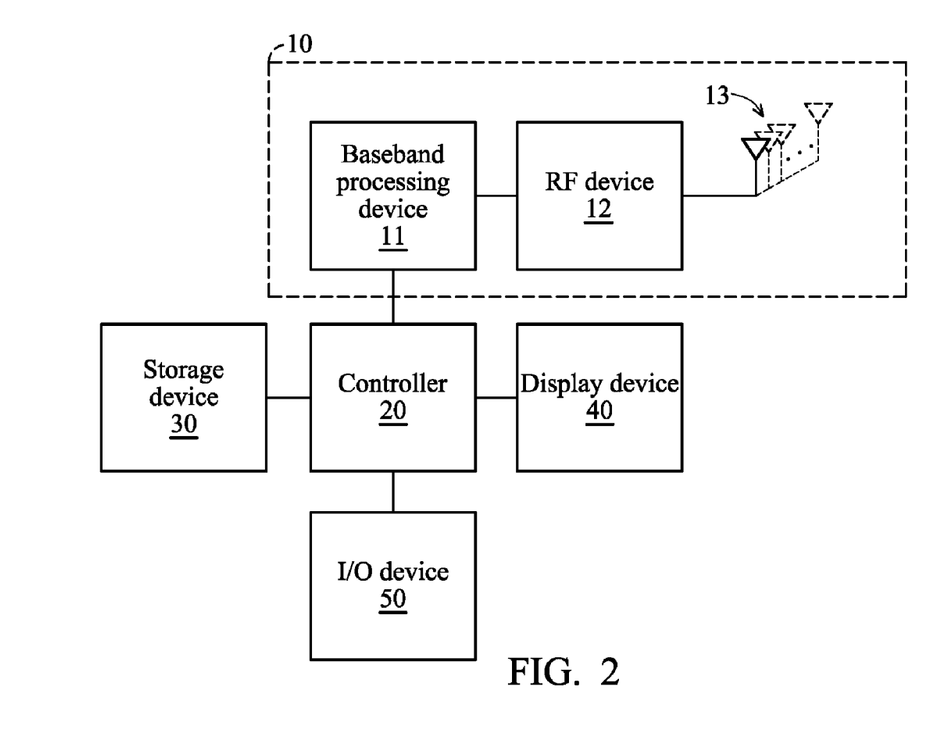
FIG. 2 is a block diagram illustrating a UE according to an embodiment of the application.

FIG. 2 is a block diagram illustrating a UE according to an embodiment of the application.

As shown in FIG. 2, a UE may include a wireless transceiver 10, a controller 20, a storage device 30, a display device 40, and an Input/Output (I/O) device 50.

The wireless transceiver 10 is configured to perform wireless transmission and reception to and from the cells formed by one or more cellular stations of the access network 121.

Specifically, the wireless transceiver 10 may include a baseband processing device 11, a Radio Frequency (RF) device 12, and antenna(s) 13, wherein the antenna(s) 13 may include one or more antennas for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna(s) 13, convert the received RF wireless signals to baseband signals, which are processed by the baseband processing device 11, or receive baseband signals from the baseband processing device 11 and convert the received baseband signals to RF wireless signals, which are later transmitted via the antenna(s) 13. The RF device 12 may also contain multiple hardware devices to perform radio frequency conversion. For example, the RF device 12 may comprise a mixer to multiply the baseband signals with a carrier oscillated in the radio frequency of the supported cellular technologies, wherein the radio frequency may be any radio frequency (e.g., 30 GHz~300 GHz for mmWave) utilized in the 5G NR technology, or may be 900 MHz, 2100 MHz, or 2.6 GHz utilized in LTE/LTE-A/TD-LTE technology, or another radio frequency, depending on the cellular technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the cells formed by cellular station of the access network 121, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for configuration of an initial DL BWP.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., the bandwidth size configuration specified in the MIB and/or SIB1), instructions, and/or program code of applications, communication protocols, and/or the method for configuration of an initial DL BWP.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application.

For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 3:
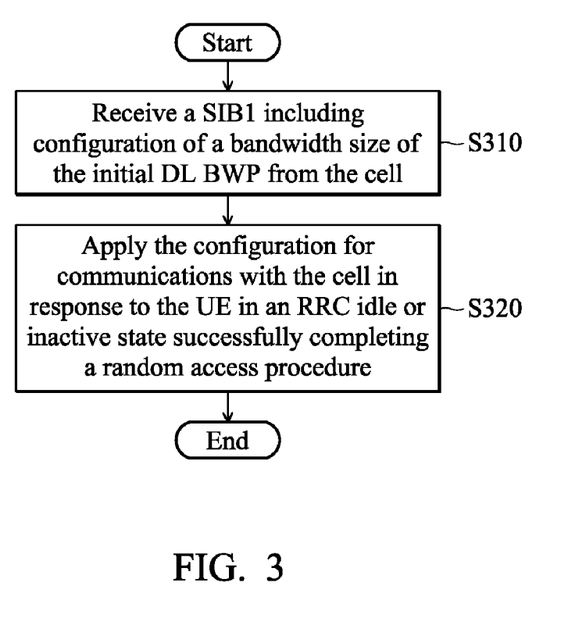
FIG. 3 is a flow chart illustrating the method for configuration of an initial DL BWP according to an embodiment of the application.

FIG. 3 is a flow chart illustrating the method for configuration of an initial DL BWP according to an embodiment of the application.

In this embodiment, the method for configuration of an initial DL BWP is applied to and executed by a UE (e.g., the UE 110) communicatively connected to a cell formed by a cellular station of a service network (e.g., a gNB or TRP of a 5G NR network).

To begin with, the UE receives a SIB1 including configuration of a bandwidth size of the initial DL BWP from the cell (step S310). The cell may be referred to as a serving cell.

The SIB1 includes a "DownlinkConfigCommonSIB" IE which further includes an "initialDownlinkBWP" IE. The "initialDownlinkBWP" IE specifies the initial DL BWP configuration for a SpCell (i.e., the PCell of a Master Cell Group (MCG) or a Secondary Cell Group (SCG)). Within the "initialDownlinkBWP" IE, the service network may configure a "locationAndBandwidth" IE so that the initial DL BWP contains the entire CORESET #0 (i.e., Control Resource Set Zero) of this serving cell in the frequency domain.

Before receiving the SIB1, the UE may first receive a MIB which includes another configuration of the bandwidth size of the initial DL BWP from the cell, and apply the bandwidth size configuration of the initial DL BWP as specified in the MIB for communication with the cell, including receiving the SIB1 and other system information, paging, and message-2/message-4 (Msg2/Msg4) of a random access procedure.

Next, the UE applies the bandwidth size configuration of the initial DL BWP as specified in the SIB1 for communication with the cell in response to the UE in the RRC idle/inactive state successfully completing a random access procedure (step S320), and the method ends.

To be more specific, before the UE in the RRC idle/inactive state has successfully completed a random access procedure, the UE just stores the first configuration and does not apply the first configuration. That is, although the SIB1 has been received and the bandwidth size configuration of the initial DL BWP has been derived from the SIB1, the UE continues to use the bandwidth size configuration for the initial DL BWP as specified in the MIB until the RRC idle/inactive UE has successfully completed a random access procedure.

In one embodiment, the UE may apply the bandwidth size configuration of the initial DL BWP as specified in the SIB1 for communication with the cell upon successful completion of the random access procedure. That is, the bandwidth size configuration of the initial DL BWP as specified in the SIB1 may be applied as soon as the random access procedure is successfully completed.

In another embodiment, the UE may apply the bandwidth size configuration of the initial DL BWP as specified in the SIB1 for communication with the cell after successfully completing the random access procedure. That is, the bandwidth size configuration of the initial DL BWP as specified in the SIB1 may be applied at any time subsequent to successful completion of the random access procedure. For example, the bandwidth size configuration of the initial DL BWP as specified in the SIB1 may be applied after receiving the RRC SETUP/RESUME message, or may be applied after the UE entering the RRC connected state.

Figure 4:
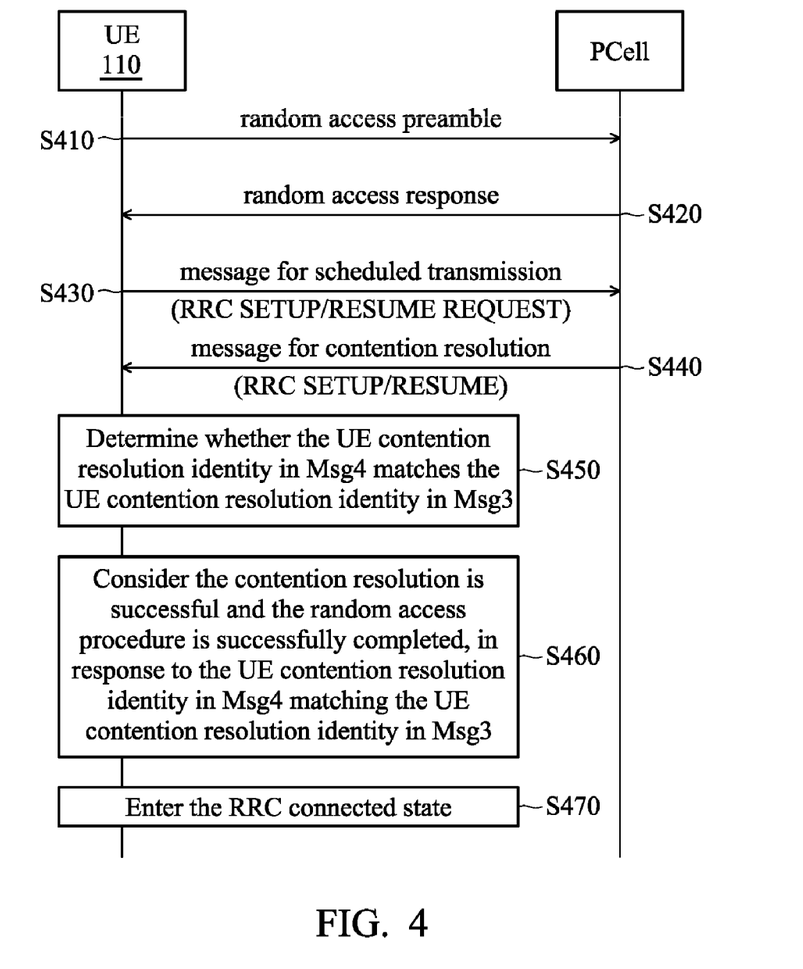
FIG. 4 is a message sequence chart illustrating a random access procedure according to an embodiment of the application.

FIG. 4 is a message sequence chart illustrating a random access procedure according to an embodiment of the application.

In this embodiment, the UE 110 is in the RRC idle/inactive state when initiating the random access procedure, and thus, the random access procedure is a contention-based random access procedure.

To begin with, the UE 110 in the RRC idle/inactive state transmits a random access preamble configured for contention-based random access procedures to a cell formed by a cellular station of a service network (e.g., a gNB or TRP of a 5G NR network) (step S410).

Specifically, the random access preamble may be randomly selected with equal probability from a set of random access preambles configured for contention-based random access procedures.

Next, when receiving the random access preamble, the cell transmits a random access response (i.e., Msg2 of a random access procedure) to the UE 110 (step S420).

Specifically, the random access response may include a Timing Advance (TA) command, an uplink grant, and/or a Temporary Cell Radio Network Temporary Identifier (TC-RNTI).

Subsequently, in response to receiving the random access response, the UE 110 transmits a message for scheduled transmission (i.e., Msg3 of a random access procedures), which may include a UE contention resolution identity (e.g., the TC-RNTI included in the random access response), to the cell (step S430).

The message for scheduled transmission may further include an RRC SETUP REQUEST message or an RRC RESUME REQUEST message, wherein the RRC SETUP REQUEST message is used to initiate/request establishment of an RRC connection when the UE is in the RRC idle mode, and the RRC RESUME REQUEST message is used to initiate/request resumption of a suspended RRC connection when the UE is in the RRC inactive mode.

When receiving the message for scheduled transmission, the cell transmits a message for contention resolution (i.e., Msg4 of a random access procedure) to the UE 110 (step S440).

Next, in response to receiving the message for contention resolution, the UE 110 determines whether the UE contention resolution identity in the message for contention resolution (i.e., Msg4) matches the UE contention resolution identity in the message for scheduled transmission (i.e., Msg3) (step S450).

In this embodiment, it is assumed that the UE contention resolution identity in Msg4 matches the UE contention resolution identity in Msg3, and in response, the UE 110 considers the contention resolution is successful, and the random access procedure is successfully completed (step S460).

In one embodiment, the message for contention resolution may further include an RRC SETUP message or an RRC RESUME message which may include configurations for establishing or resuming an RRC connection. That is, the message for contention resolution and the RRC SETUP/RESUME message are sent together in the same Media Access Control (MAC) Protocol Data Unit (PDU) to the UE 110.

In another embodiment, the message for contention resolution may not include an RRC SETUP message or an RRC RESUME message, and the RRC SETUP message or the RRC RESUME message may be sent to the UE 110 after the message for contention resolution. That is, the message for contention resolution and the RRC SETUP/RESUME message are sent separately to the UE 110.

After that, in response to successfully completing the random access procedure, the UE 110 enters the RRC connected state from the RRC idle/inactive state (step S470).

Specifically, the UE 110 may apply the configurations for establishing or resuming an RRC connection as specified in the RRC SETUP/RESUME message, so that it may enter the RRC connected state.

Figure 5:
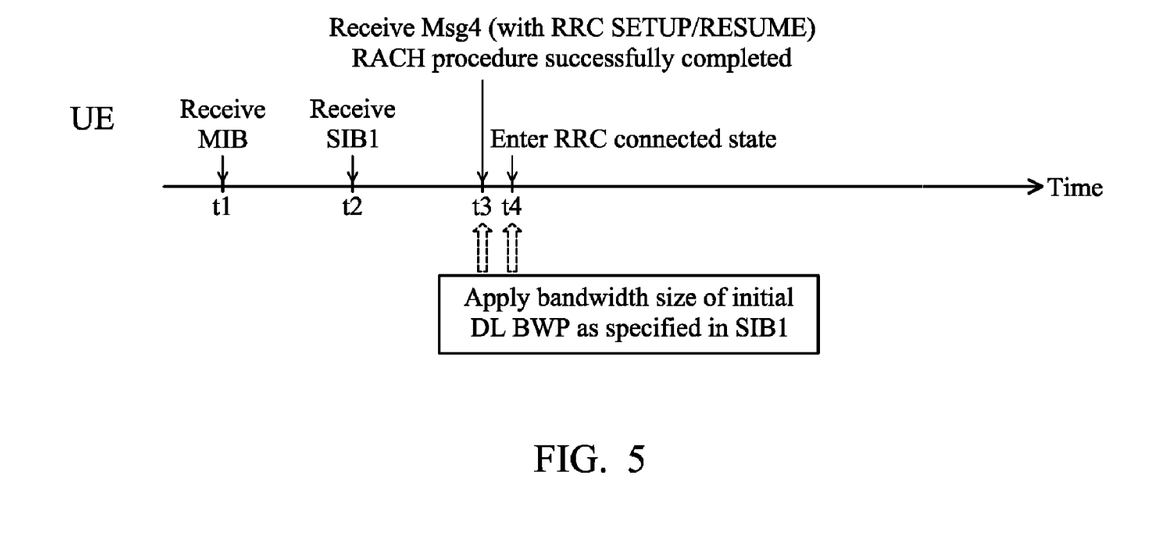
FIG. 5 is a schematic diagram illustrating the timing of applying the bandwidth size configuration for the initial DL BWP as specified in the SIB1 according to an embodiment of the application.

FIG. 5 is a schematic diagram illustrating the timing of applying the bandwidth size configuration for the initial DL BWP as specified in the SIB1 according to an embodiment of the application.

At time t1, the UE receives a MIB from the cell, wherein the MIB includes the most essential system information for the UE to access the cell. Specifically, the MIB includes the "pdcch-ConfigSIB1" IE, which specifies the Physical Downlink Control Channel (PDCCH) resource for the UE to acquire the SIB1. The "pdcch-ConfigSIB1" IE consists of two IEs known as "controlResourceSetZero" and "SearchSpaceZero", which specify the ID of control resource set and search space of the initial DL BWP, respectively, for the UE to receive PDCCH. Upon receiving the MIB, UE may use the bandwidth size of controlResourceSetZero as its bandwidth size of the initial DL BWP, and try to receive the SIB1 on the PDCCH configured based on controlResourceSetZero and SearchSpaceZero.

At time t2, the UE receives the SIB1 from the cell, wherein the SIB1 includes the basic information of the serving cell, including the configuration of the initial DL BWP. Specifically, a BWP is physically characterized by 3 parameters: locationAndBandwidth, subcarrierSpacing (SCS), and cyclicPrefix (CP), in which the locationAndBandwidth defines the location and bandwidth size of the initial DL BWP. In addition to BWP information, the SIB1 includes information for the UE to perform initial access such as configuration for random access procedure. Thus, after successful acquisition of the SIB1, the UE has sufficient information to perform the random access procedure.

At time t3, the UE receives the Msg4 of the random access procedure, and considers the random access procedure successfully completed in response to the Msg4 passing the check of contention resolution.

Please note that, although not shown, the UE may transmit/receive Msg1~Msg3 of the random access procedure at some times between time t2 and time t3.

Specifically, in this embodiment, the RRC SETUP/RESUME message is sent together with the Msg4.

At time t4, the UE establishes an RRC connection and enters the RRC connected mode according to the RRC SETUP/RESUME message.

As shown in FIG. 5, the UE may apply the bandwidth size of the initial DL BWP as specified in the SIB1 at time t3 (i.e., after receiving the Msg4 or after receiving the RRC SETUP/RESUME message), or at time t4 (i.e., after entering the RRC connected state).

Figure 6:
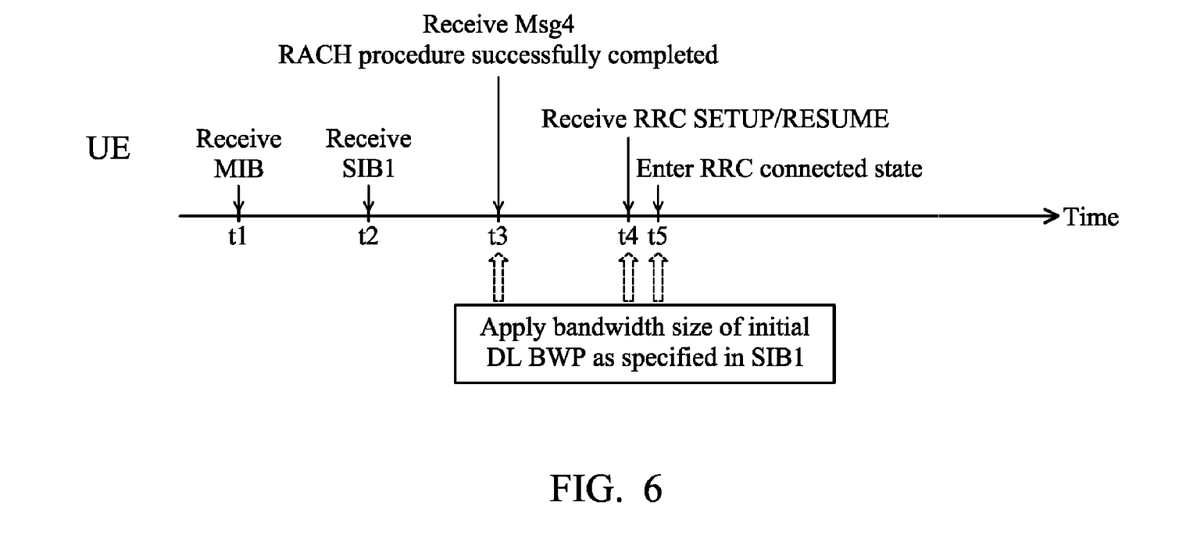
FIG. 6 is a schematic diagram illustrating the timing of applying the bandwidth size configuration for the initial DL BWP as specified in the SIB1 according to another embodiment of the application.

FIG. 6 is a schematic diagram illustrating the timing of applying the bandwidth size configuration for the initial DL BWP as specified in the SIB1 according to another embodiment of the application.

Similar to the embodiment of FIG. 5, the UE receives a MIB at time t1 and receives a SIB1 at time t2.

At time t3, the UE receives the Msg4 of the random access procedure, and considers the random access procedure successfully completed in response to the Msg4 passing the check of contention resolution.

Please note that, although not shown, the UE may transmit/receive Msg1~Msg3 of the random access procedure at some times between time t2 and time t3.

Specifically, in this embodiment, the RRC SETUP/RESUME message is sent after the Msg4.

At time t4, the UE receives the RRC SETUP/RESUME message from the cell.

At time t5, the UE establishes an RRC connection and enters the RRC connected mode according to the RRC SETUP/RESUME message.

As shown in FIG. 6, the UE may apply the bandwidth size of the initial DL BWP as specified in the SIB1 at time t3 (i.e., after receiving the Msg4), or at time t4 (i.e., after receiving the RRC SETUP/RESUME message), or at time t5 (i.e., after entering the RRC connected state).

In view of the forgoing embodiments, it should be appreciated that the present application eliminates unnecessary power consumption of the UE by postponing the timing of applying the bandwidth size of the initial DL BWP as specified in the SIB1. For the UE in the RRC idle or RRC inactive state, before successful completion of the random access procedure, the UE applies the bandwidth size of CORESET0 derived from the MIB to receive the SIB1, other system information (OSI), and to perform the random access procedure (i.e., receive Msg2 and Msg4). After successful completion of the random access procedure, the UE applies the bandwidth size of the initial DL BWP derived from the SIB1. Advantageously, the UE will not apply the bandwidth size derived from the SIB1 when there is no need to receive DL message/data with a wider bandwidth.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention claimed is:

1. A User Equipment (UE), comprising:
a wireless transceiver, configured to perform wireless transmission and reception to and from a cell; and
a controller, configured to receive a System Information Block type1 (SIB1) comprising first configuration of a bandwidth size of an initial Downlink (DL) Bandwidth Part (BWP) from the cell via the wireless transceiver, and apply the first configuration for communication with the cell via the wireless transceiver in response to the UE in a Radio Resource Control (RRC) idle or inactive state successfully completing a random access procedure.

2. The UE of claim 1, wherein the controller is further configured to receive a Master Information Block (MIB) comprising second configuration of the bandwidth size of the DL BWP from the cell via the wireless transceiver, and apply the second configuration, instead of the first configuration, for communication with the cell via the wireless transceiver before the UE in the RRC idle or inactive state successfully completes the random access procedure.

3. The UE of claim 2, wherein the SIB1 is received by applying the second configuration.

4. The UE of claim 1, wherein the controller is further configured to receive an RRC SETUP message or an RRC RESUME message from the cell via the wireless transceiver in response to the UE in the RRC idle or inactive state successfully completing the random access procedure, and the applying of the first configuration is performed after the reception of the RRC SETUP message or the RRC RESUME message.

5. The UE of claim 1, wherein the controller is further configured to enable the UE to enter an RRC connected state in response to the UE in the RRC idle or inactive state successfully completing the random access procedure, and the applying of the first configuration is performed after the UE enters the RRC connected state.

6. The UE of claim 1, wherein the cell is a fifth generation (5G) New Radio (NR) cell, and the first configuration is comprised in a "locationAndBandwidth" Information Element (IE) in the SIB1.

7. A method for configuration of an initial Downlink (DL) Bandwidth Part (BWP), executed by a User Equipment (UE) communicatively connected to a cell, the method comprising:
receiving a System Information Block type1 (SIB1) comprising first configuration of a bandwidth size of the initial DL BWP from the cell; and
applying the first configuration for communication with the cell in response to the UE in a Radio Resource Control (RRC) idle or inactive state successfully completing a random access procedure.

8. The method of claim 7, further comprising:
receiving a Master Information Block (MIB) comprising second configuration of the bandwidth size of the DL BWP from the cell; and
applying the second configuration, instead of the first configuration, for communication with the cell before the UE in the RRC idle or inactive state successfully completes the random access procedure.

9. The method of claim 8, wherein the SIB1 is received by applying the second configuration.

10. The method of claim 7, further comprising:
receiving an RRC SETUP message or an RRC RESUME message from the cell in response to the random access procedure;
wherein the applying of the first configuration is performed after the reception of the RRC SETUP message or the RRC RESUME message.

11. The method of claim 7, further comprising:
enabling the UE to enter an RRC connected state in response to the UE in the RRC idle or inactive state successfully completing the random access procedure;
wherein the applying of the first configuration is performed after the UE enters the RRC connected state.

12. The method of claim 7, wherein the cell is a fifth generation (5G) New Radio (NR) cell, and the first configuration is comprised in a "locationAndBandwidth" Information Element (IE) in the SIB1.

* * * * *